Figure 1:
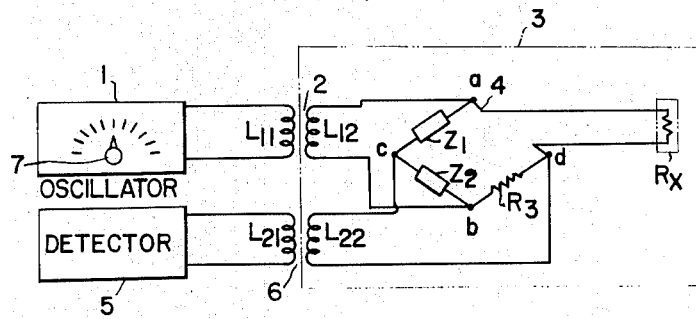

3,224,257
ROTATING BODY STRAIN METER
Katsumi Takami, Kitatama-gun, Tokyo-to, and Kiyokata Matsuura, Chikusa-ku, Nagoya-shi, Japan, assignors to Kabushiki Kaisha Hitachi Seisakusho, Tokyo-to, Japan, a joint-stock company of Japan
Filed June 4, 1963, Ser. No. 285,426
Claims priority, application Japan, June 5, 1962, 37/22,481
2 Claims. (Cl. 73—88.5)

This invention relates to a strain meter. More particularly, it concerns a strain meter apparatus permitting measurement of the strain at any desired point in a rotating body from a stationary point through the implementation of an extremely simple alternating current bridge as proposed in this invention instead of the attachment of a transmitter with an integrally contained direct current vo transmitter with an integrally contained direct current voltage source as normally adapted.

According to the conventional method of measuring electrically the strain of a roating body, by attaching a transmitter provided with the direct current source to the rotating body, the frequency oscillated from the said transmitter corresponding to the strain of the point to be detected has been measured on the stationary side or by attaching a suitable strain guage rotating body, resistance change in the strain guage directly taken by the mechanical method has been measured on the stationary side. In any case, the use of a transmitter requires the provision of a direct current voltage source in the rotating body wherefore and depending on the point to be measured, its use may become limited to a susbtantial degree because of its structural composition. Moreover, the calibration involved in a transmitter is unquestionably bothersome. Furthermore, a direct current voltage source if to be incorporated in a high speed rotating body must be extremely lightweight and of least bulk in order to withstand the centrifugal force which it undergoes. Also, if the factor of power source degeneration is taken into account, measurements taken continuously and in an extended period cannot be expected to be accurate. On the other hand, if the change in resistance in the strain gauge is to be sensed directly by mechanical means, the signal from the rotating body must necessarily be transmitted through an electro-mechanical contact means such as a slip ring. Considering the mechanical wear and the possibilites of inviting signal attenuation in the slip ring itself and decrease in the signal-to-noise ratio $s/n$, the use of slip rings unquestionsibly is not a desirable means from the standpoint of measuring techniques because of the uncertainties they introduce.

In all cases, the conventional strain meter as applied to rotating bodies has many inherent deficiences in its mechanical as well as electrical composition. Therefore, the present inventors propose an alternating current bridge for attachment to the rotating body, one side of the bridge being composed of a strain gauge whose resistance varies corresponding to the strain change of the point to be detected in the rotating body and impressment of a variable frequency input to the above said bridge circuit from the stationary side through an electromagnetic or electrostatic coupling means provided between the stationary side and the rotating body thus enabling detection of the state of balance or unbalance in the said bridge in relation to the above said resistance value. Accordingly, the inventors have verified that a strain meter as proposed by the present invention can satisfactorily and fully eliminate the inherent deficiencies associated with conventional measuring means.

Figure 2:
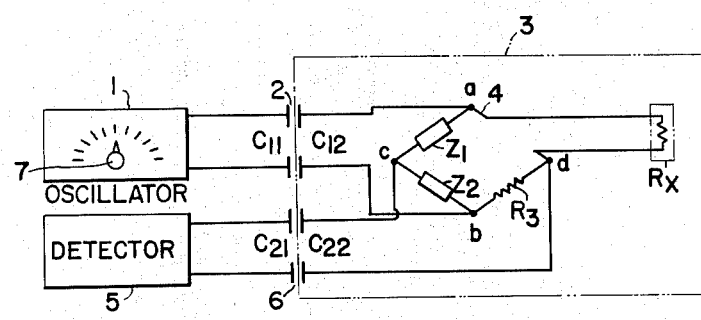

The essence and embodiments of the present invention will become more clearly understood by a study of the specification particulars and appended drawings given for purposes of illustration, forming a part hereof and in which drawings:

FIGURE 1 shows a circuit scheme of an example of execution of the present invention; and
FIGURE 2 shows a schematic layout of an alternative example of execution of the present invention.

FIGURE 1 depicts a cricuit scheme of an example of execution of the present invention in which 1 is a variable frequency signal oscillator provided with an adjustable knob 7, 2 indicates an electromagnetic coupling coil provided for the transmission of the frequency signal to the rotating body from the stationary side, 3 is a rotating body, 4 represents the alternating current bridge one side $R_x$ affixed to the point to be detected in the rotating body 3 is a strain gauge resistance varies corresponding to the strain change, 5 indicates the detector circuit for determining the balance in the alternating current bridge circuit, and 6 is an electromagnetic coupling coil for taking out the voltage of the aforementioned bridge circuit at the starting side.

If now it is desired to measure the strain at any particular point in the rotating body 3, an appropriate point on the rotating body 3, say the rotating shaft, would first be affixed to the elements $Z_1$, $Z_2$, $Z_3$ representing the three sides of the alternating current bridge 4 with, moreover, the immovable attachment of the stain gauge element $R_x$ representing the remaining side to the above said particular point. Now, a variable frequency signal generated by the oscillator 1 is applied across a couple of terminals $a$, $b$ in the alternating current bridge circuit through the medium of the coils $L_{11}$, $L_{12}$ comprising the electromagnetic couple 2. Next, the balance in the alternating current bridge circuit 4 is checked by detecting the signal from another couple of terminals $c$, $d$ in the above said alternating current bridge 4 by the detector circuit, composed of an amplifier and Braun tube oscilloscope, through the coils $L_{21}$, $L_{22}$ comprising another electromagnetic couple 2. Supposing that the strain gauge element $R_x$ is subjected to change in its resistance value due to strain, the balance in the alternating current bridge would be unbalanced. At that time, the above-mentioned bridge circuit is caused to balance by varying the frequency of said variable frequency signal. As already known, the balance condition of said alternating current bridge circuit can be expressed by the following equation:

$$\frac{Z_1}{Z_2} = \frac{R_x}{R_3}$$

Let us assume that $Z_1$ and $Z_2$, for instance, are impedance elements whose values vary in accordance with the frequency of said variable frequency signal, and $Z_3$ is a fixed resistor. It goes without saying that in such a case the abovementioned bridge circuit is not limited.

Now then, if the balance in the bridge circuit 4 is checked by the detector circuit 5, it will be found that a reading of the strain at the point under measurement can be taken directly from the oscillation frequency of the oscillator 1 because of the fixed relationship between the resistance value in the strain gauge element and the generated strain.

It is understood, naturally, that the relation between the oscillation frequency and the strain gauge element $R_x$ comprising the side of the alternating current bridge circuit must first be calibrated in order that the strain can be determined from the oscillation frequency of the oscillator 1 located on the stationary side. Moreover, it is understood that the primary objective can be satisfied by substituting an electrostatic couple ($C_{11}$–$C_{12}$, $C_{21}$–$C_{22}$) as shown in FIGURE 2 instead of an electromagnetic couple.

It is readily apparent from the foregoing description that the strain meter as proposed in the present invention embodies the use of a strain gauge element as an arm in the rotating body to be measured and the attachment of only an alternating current bridge composed of impedance elements formed only of passive elements. Since all other elements of the measuring apparatus are located on the stationary side, it is obvious that no direct current power source or complicated oscillator need be attached to the rotating body. Furthermore, the alternating current bridge circuit can be made extremely lightweight and compact since the impedance elements as noted above can be made in micro-module form. Since, moreover, signals are transmitted to the rotating body side and to the stationary side by electromagnetic or electrostatic coupling rather than through electrical or mechanical contacts, the method of coupling obviously eliminates problems of frictional wear and signal attenuation. Consequently, the strain meter of the present invention is significant as it affords a simple, durable, stable and accurate means for the measurement of the strain in a rotating body regardless of its high speed.

It is obvious that various changes may be made in the circuitry composition without departing from the spirit of the present invention, which is therefore not to be limited to the specific embodiments given herein for purposes of illustration. Rather, it is the desire to seek protection on the strain meter apparatus encompassed fairly within the scope of the claim defined hereinafter.

What is claimed to be new is:

1. A rotating body strain meter comprising, in combination: a strain gauge element affixed to a rotating body at a point where strain is to be measured, said element varying its resistance in correspondence to strain changes; an alternating current bridge affixed to said rotating body comprising said strain gauge element and a resistive element as first adjacent arms and two impedance elements as second adjacent arms; means for applying an electric variable frequency signal to the junctions formed by said first and second adjacent arms by electromagnetic coupling; means for taking voltage from said bridge by electromagnetic coupling to detect bridge unbalance; and means for varying the frequency of said electric variable signal to provide an indication of strain.

2. A rotating body strain meter comprising, in combination: a strain gauge element affixed to a rotating body at a point where strain is to be measured, said element varying its resistance in correspondence to strain changes; an alternating current bridge affixed to said rotating body comprising said strain gauge element and a resistive element as first adjacent arms and two impedance elements as second adjacent arms; means for applying an electric variable frequency signal to the junctions formed by said first and second adjacent arms by electrostatic coupling; means for taking voltage from said bridge by electrostatic coupling to detect bridge unbalance; and means for varying the frequency of said electric variable signal to provide an indication of strain.

References Cited by the Examiner
UNITED STATES PATENTS

| 2,416,276 | 2/1947 | Ruge | 73—88.5 |
| 2,447,566 | 8/1948 | Decker et al. | 73—88.5 X |
| 2,531,228 | 11/1950 | Macgeorge | 73—88.5 X |

OTHER REFERENCES

Michels, Walter C., editor-in-chief. The International Dictionary of Physics and Electronics. D. Van Nostrand Company, Inc., 1961, page 275.

RICHARD C. QUEISSER, *Primary Examiner.*

J. J. SMITH, *Assistant Examiner.*